United States Patent
Neuss et al.

(10) Patent No.: US 6,502,897 B2
(45) Date of Patent: Jan. 7, 2003

(54) COMPONENT FOR A MOTOR VEHICLE

(75) Inventors: Sabine Neuss, Freiberg/Neckar (DE); Thomas Reddig, Bietigheim-Bissingen (DE); Walter Wolf, Oppenweiler-Zell (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/947,762

(22) Filed: Sep. 7, 2001

(65) Prior Publication Data

US 2002/0030386 A1 Mar. 14, 2002

(30) Foreign Application Priority Data

Sep. 8, 2000 (DE) .......................................... 100 44 379

(51) Int. Cl.⁷ ................................................. B60H 1/24
(52) U.S. Cl. ............................ 296/208; 296/70; 454/69
(58) Field of Search ........................... 296/208, 190.09, 296/188, 72, 70; 454/69, 141

(56) References Cited

U.S. PATENT DOCUMENTS

| 5,354,114 A | * 10/1994 | Kelman et al. ............. 296/192 |
| 5,967,598 A | * 10/1999 | Eilemann et al. ........... 296/208 |
| 5,979,540 A | * 11/1999 | Allison et al. ................ 165/41 |
| 6,110,037 A | * 8/2000 | Yoshinaka .................... 296/70 |
| 6,186,887 B1 | 2/2001 | Dauvergne |
| 6,203,092 B1 | * 3/2001 | Yoshinaka .................... 296/70 |
| 6,231,116 B1 | * 5/2001 | Naert et al. ................. 296/192 |
| 6,273,495 B1 | * 8/2001 | Haba et al. ................. 296/194 |
| 6,276,739 B1 | 8/2001 | Wich |

FOREIGN PATENT DOCUMENTS

| DE | 197 53 877 | 6/1998 |
| DE | 197 20 902 | 11/1998 |
| DE | 299 16 466 | 1/2000 |
| EP | 0 370 342 | 5/1990 |

* cited by examiner

*Primary Examiner*—Joseph D. Pape
*Assistant Examiner*—Gregory A Blankenship
(74) *Attorney, Agent, or Firm*—Fokey & Lardner

(57) ABSTRACT

Disclosed is a component in a hybrid construction, in particular a cross member for arranging between A-pillars of a motor vehicle, having a shell-shaped base body which is stiffened by plastic reinforcing ribs and in which at least one duct is provided. In order to be able to integrate a duct in an advantageous manner, it is proposed that the duct is formed at least in some areas from a plastic shell which is injected together with the reinforcing ribs, extends in the longitudinal direction of the component and can be closed by means of a cover so as to form the duct. The component according to the invention is used as a dashboard support in a motor vehicle.

12 Claims, 6 Drawing Sheets

COMPONENT FOR A MOTOR VEHICLE

The right of priority is claimed based on German Patent Application 100 44 379.6, filed Sep. 8, 2000, the disclosure of which is hereby incorporated by reference in its entirety.

BACKGROUND OF THE INVENTION

1. Field of the Invention

The invention relates to a component for a motor vehicle and, in particular, to a cross member for the cockpit region of a motor vehicle.

2. Description of Related Art

The motor-vehicle industry has disclosed cross members which consist of pipes made of metal and having large wall thicknesses in order to provide sufficient resistance to bending, buckling and torsion, and hence sufficient pressure load-bearing capacity. These result in a high weight and disadvantages in terms of costs. Although, in principal, the pipes could be used for guiding air from, for example, an air conditioning system arranged centrally in the vehicle to lateral discharging means, such use has not been made to date since undesirable condensation water can easily be deposited on the metal pipes (see, for example, DE 197 53 877). Accordingly, although mentioned here, such cross members are not believed to relate to the same field of use as the present invention.

Furthermore, cross members are known which have a two-shell construction with webs welded into it for stabilization purposes. A cross member of this type is disclosed, for example, in DE 197 20 902. Cross members of this type are very expensive to produce and have a high weight. Guiding of air is not possible, and, as with the cross members referenced above, these cross members are mentioned here although they are not believed to relate to the same field of use as the present invention.

EP 0 370 342 discloses a lightweight component of a hybrid construction which can be used as a support in the motor vehicle and which has a shell-shaped base body which preferably is made of metal and in which reinforcing ribs are arranged. The reinforcing ribs are made of injected plastic and are connected to the metal base body at discrete connecting points by the plastic passing through apertures arranged in the metal part and extending beyond the surfaces of the apertures. The metal base body is of U-shaped design, and the reinforcing ribs pass through the interior of the base body in order to obtain high stiffness and strength. This known hybrid component has an advantageously low weight while at the same time having sufficient strength, stiffness and load-bearing capacity. Guiding of air is not possible by means of this lightweight component which can be used as a support. Accordingly, although mentioned here, such a cross member is not believed to relate to the same field of use as the present invention.

A cross member of the type mentioned at the beginning and having an air duct is disclosed, for example, in DE-U 299 16 466. In this type of construction, air guiding ducts are inserted below the plastic ribbed arrangement as a premanufactured, tubular structure after production of the cross member of a hybrid construction. Introducing a duct in this manner is costly and can only be carried out with difficulty.

SUMMARY OF THE INVENTION

An object of the invention is to provide an improved lightweight component into which a duct can be advantageously integrated.

In accomplishing the objects of the invention, there has been provided according to one aspect of the invention a cross member suitable for a motor vehicle comprising (a) a base body comprising a base, a first wall and a second wall arranged in a concave cross section; (b) a plastic reinforcing rib assembly injection molded on said base of said base body to stiffen said base body; (c) a plastic shell injection molded together with said plastic reinforcing rib assembly; bearing against the side of said base opposite to said plastic reinforcing rib assembly and extending in a longitudinal direction along at least a portion of the cross member; and (d) a cover covering said plastic shell and thereby defining a duct.

According to another aspect of the invention, there is provided a cross member as wherein said plastic reinforcing rib assembly comprises a first plastic web formed with said base body and extending, in the same plane as, but in the opposite direction from said first wall; and a second plastic web formed with said base body and extending in the same plane as, but in the opposite direction from said second wall, and plastic ribs extend between said first and second plastic webs.

Further objects, features and advantages of the present invention will become apparent from the detailed description of preferred embodiments that follows when considered together with the accompanying drawings.

BRIEF DESCRIPTION OF THE DRAWINGS

The invention is explained in detail below with reference to the exemplary embodiments and with reference to the accompanying drawings, in which.

DETAILED DESCRIPTION OF PREFERRED EMBODIMENTS

Figure 1:
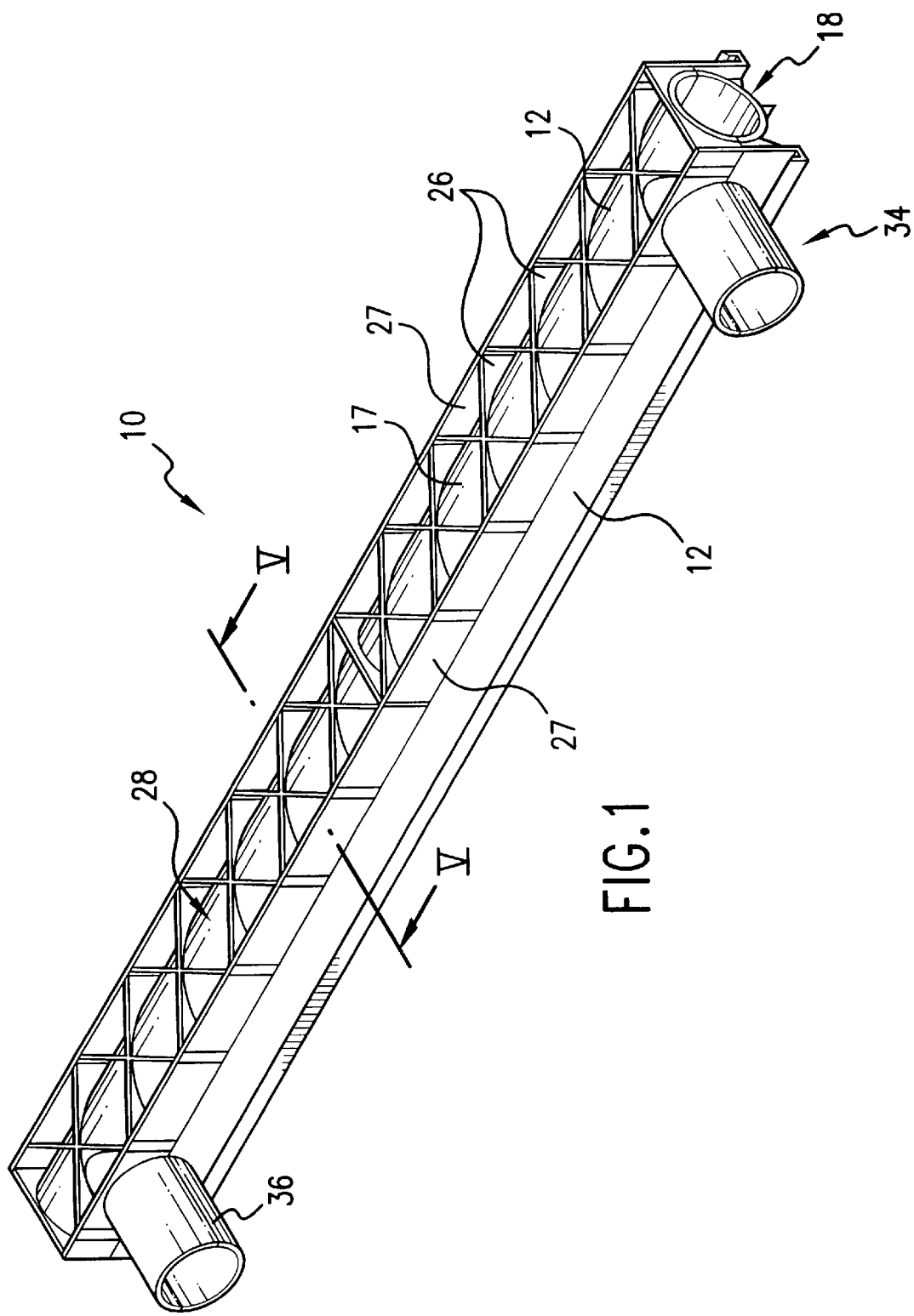
FIG. 1 shows a perspective view of a component according to the invention.

The component according to the invention has a shell-shaped base body which is stiffened by plastic reinforcing ribs and in which at least one duct is provided. The duct is, at least in parts, formed from a plastic shell which is injected together with the reinforcing ribs. The plastic shell extends in the longitudinal direction of the cross member and can be closed by means of a cover so as to form the duct. In this design, the reinforcing ribs and the plastic shell are injected integrally around the base body. As a result, the injection molding die can be, for example, a simple open/closed die, i.e., without additional slides or cores, and such a design can be cost effective. The cover can also be produced in a relatively simple open/closed die such that the component according to the invention can be produced cost effectively.

Furthermore, ducts having nonrectilinear profiles can be produced without additional expense and without additional slides or cores in the injection molding die. As a result, nonrectilinear components of a hybrid construction with an integrated duct can also be produced cost effectively. The additional capability of providing nonrectilinear profiles is particularly advantageous, because the component, for example, a cross member for dashboard support, can be adapted to the topological conditions in a motor vehicle without any problems.

In sum, a component of hybrid construction is provided which (1) has the advantages of hybrid construction, namely, very favorable weight with good strength, stiffness and load-bearing capacity as well as simple, rapid and cost-effective producibility, and (2) also functions as a guide for a very wide variety of media. Air can, for example, be guided through the duct from an air conditioning system to discharging vents. The component preferably forms a cross member which can be arranged between the A-pillars of the vehicle and to which the dashboard and further components, such as a steering column, an airbag or the like can be connected. Other media, such as wiper fluid for the headlights or the windshield, cooling water, oil, compressed air or the like could also be led through or stored in the duct. Similarly, the duct can also be used for the protected laying of cables, a gasoline line, oil line, compressed air lines or the like or for storing objects.

The cover can preferably be fastened, for example, by means of latching connections, clips or screws or the like. As a result, the installation of the cover is considerably simplified, and considerable time-savings can be realized.

Alternatively, the cover can be fastened nondetachably by means of, for example, riveting, welding, bonding or the like.

The cover should advantageously be designed as a stiffening element, so that the cover not only surrounds the duct circumferentially, but also contributes to stiffening the component. As a result, the component has greater overall strength. The cover itself could have stiffening ribs and be fastened to the base body in a suitable manner thereby increasing overall strength.

In a further embodiment of the invention, the cover is an integrated part of a housing of a heating or air conditioning system, such that the housing is, at least partially, integrated with the component according to the invention. As a result, the number of parts is limited, and installation time and outlay can be saved during the manufacturing of the motor vehicle.

In order to provide the option of connecting further components to the component of the invention, according to one embodiment of the invention fastening elements are arranged on the cover and/or plastic ribbing. The fastening elements can be integrally formed thereon by injection molding during production.

In another embodiment of the invention, a subregion of the base body, seen in cross section, forms part of the wall of the duct. This results in a savings on plastic material.

One option for use of the component according to the invention is as a cross member in a front end region of the motor vehicle. As part of this option, the duct is used as a cable duct or a container for a medium, such as wiping fluid for the headlights or the windshield, cooling water, oil, compressed air or the like. Alternatively, the duct may be used for protected laying of a gasoline line, oil line, compressed air lines or the like. The component according to the invention could also be used as a rear end or rear closure module.

Turning now to the drawings, a component 10 according to the invention has a shell-shaped base body 12. The base body 12 is preferably made of metal, but at least of a high-strength plastic. The base body 12 is preferably of U-shape design in cross section, having U limbs 22 and a base 24. The base 24 is preferably of an approximately curved design such as the semicircular design depicted in FIG. 4. A plastic shell 16 which preferably extends in the longitudinal direction of the component 10 is arranged in at least some areas in the interior 14 of the base body 12. The plastic shell 16 bears against the base 24. The base body 12 is covered here by the plastic forming the plastic shell 16.

Figure 2:
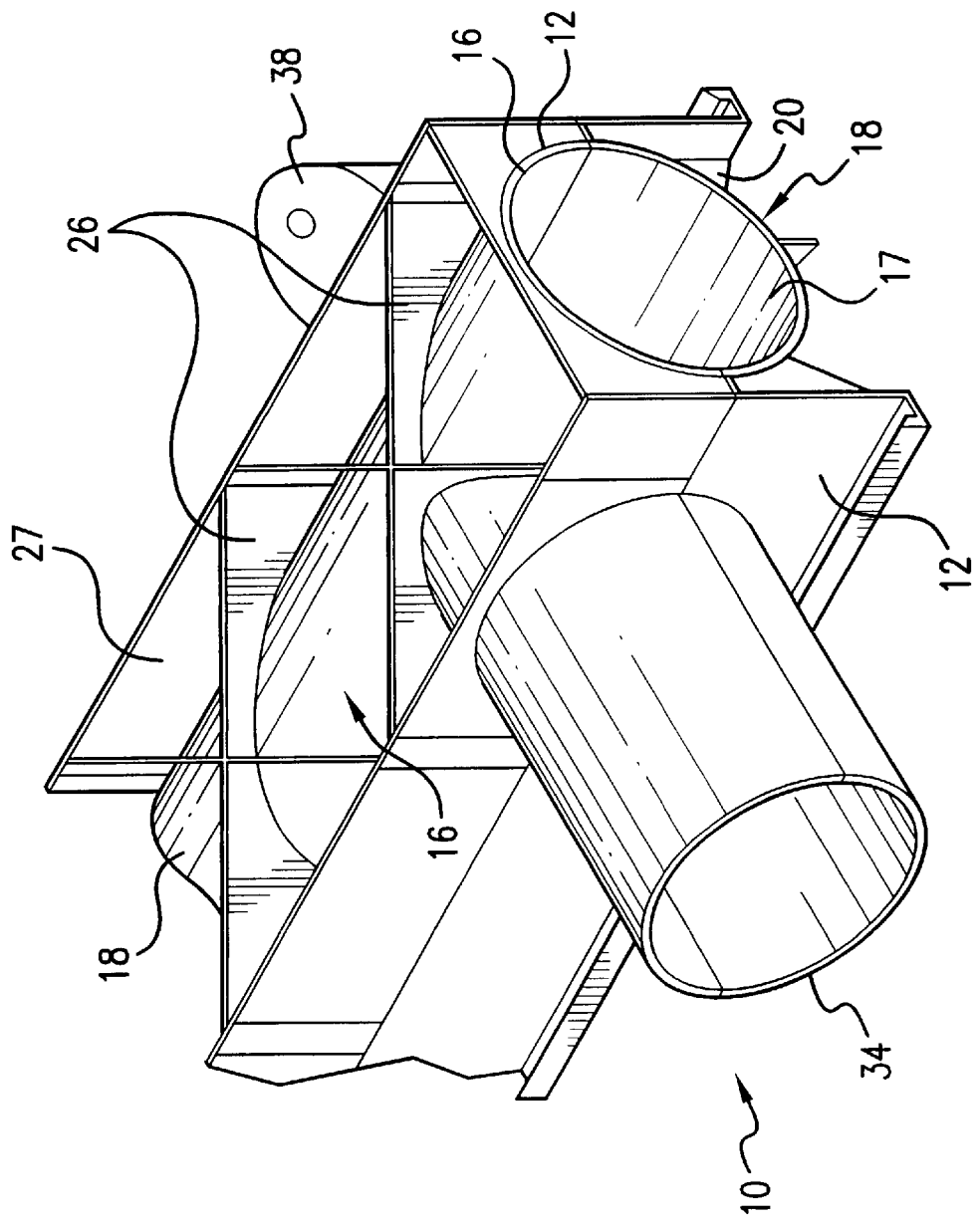
FIG. 2 shows a detailed perspective view of one end of the component.
Figure 3:
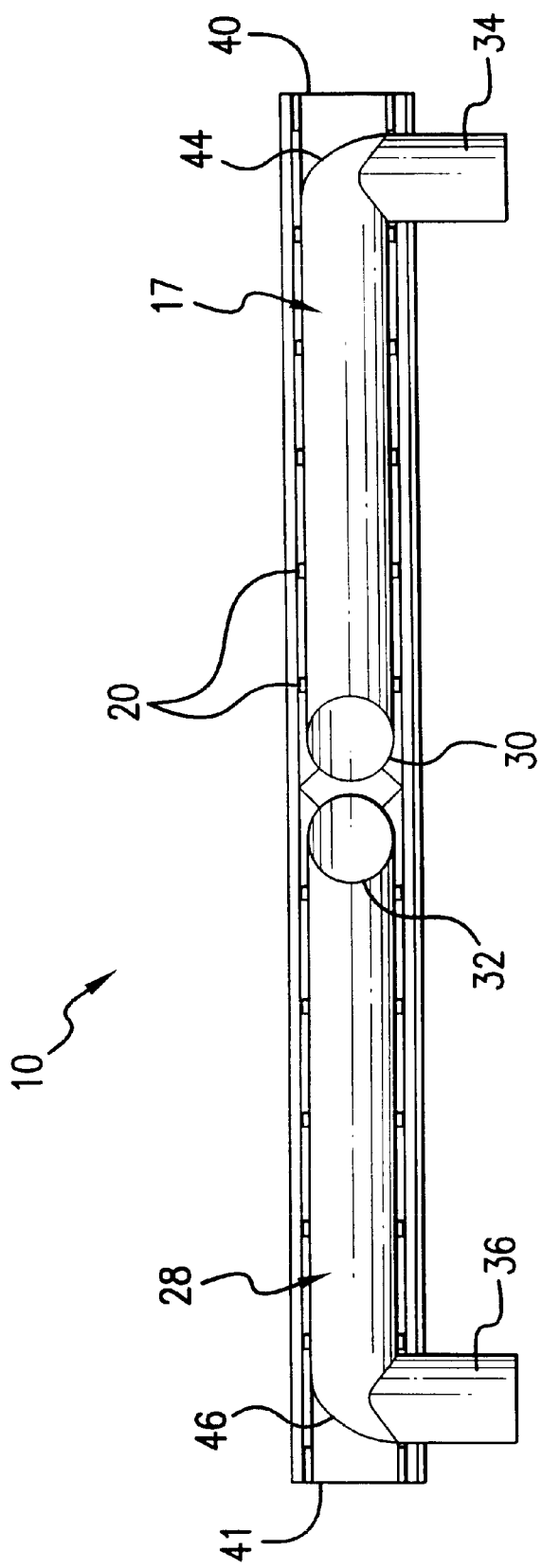
FIG. 3 shows a cross section along the line IV—IV from FIG. 4.

In order to increase the stability of the component 10, reinforcing ribs 26 are arranged outside the interior, particularly in the region of the base 24, as depicted in FIGS. 1 and 2. The reinforcing ribs 26 preferably form a rhombic pattern. Additionally, at the edge of component 10, webs 27 are provided. These webs are also made of plastic and are injected together with the reinforcing ribs 26. As depicted in FIG. 2, by way of example only, fastening tabs 38 or the like can be arranged on the webs 27.

The plastic shell 16, the reinforcing ribs 26 and the webs 27 are injected integrally around the base body 12 in an injection molding process and are connected to the latter, as is described in EP 0 370 342 which is hereby incorporated by reference in its entirety. The component 10 is therefore constructed in what is referred to as a hybrid construction.

Figure 4:
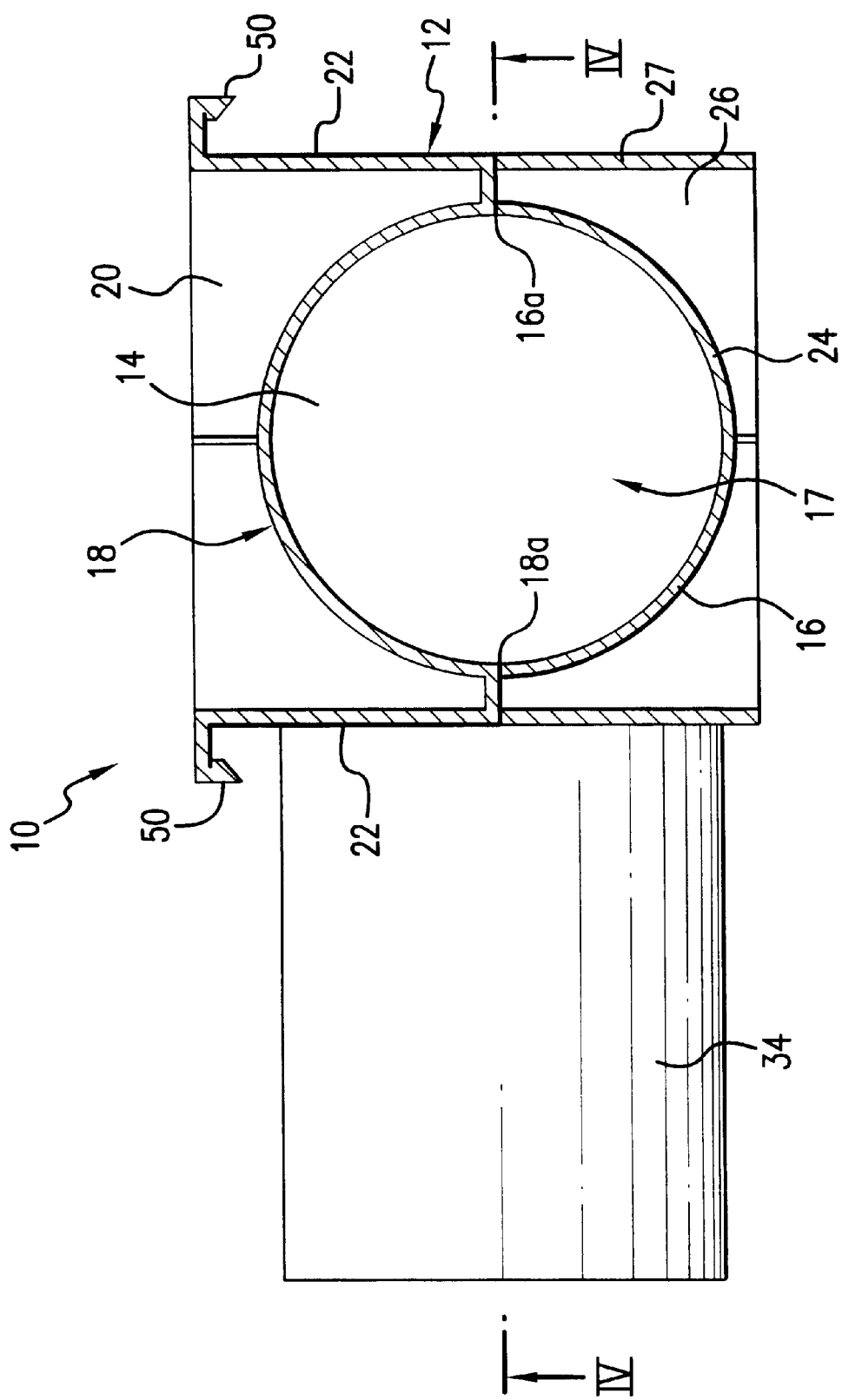
FIG. 4 shows a cross section along the line V—V from FIG. 1.

The plastic shell 16 can be closed by a cover 18 so as to form a duct 17 which extends in the longitudinal direction of the component 10. In the exemplary embodiment illustrated in FIGS. 1 to 4, the cover 18 forms the second, semicircular half of the duct 17 and is arranged in the interior 14 of the base body 12, in the region between the two limbs 22. The cover 18 is produced separately and can be connected to the base body 12 via, for example, latching connections 50 as depicted in FIG. 4. Alternatively, the cover 18 could also, for example, be screwed, clipped or nondetachably bonded, welded or riveted to the base body 12. In the case of riveting, the cover 18 could have riveting pins, not illustrated here for the sake of clarity, which are injection molded onto it and, after the cover is placed on, are deformed so as to form the rivet. On its exterior, cover 18 also preferably has reinforcing ribs 20, which likewise form a rhombic or similar pattern. The cover 18 can itself be constructed as a hybrid construction.

Although not illustrated here for the sake of clarity, abutting edges 16a and 18a of the two duct halves 16 and 18 could be connected to each other via a tongue and groove connection in order to increase the leaktightness.

Figure 5:
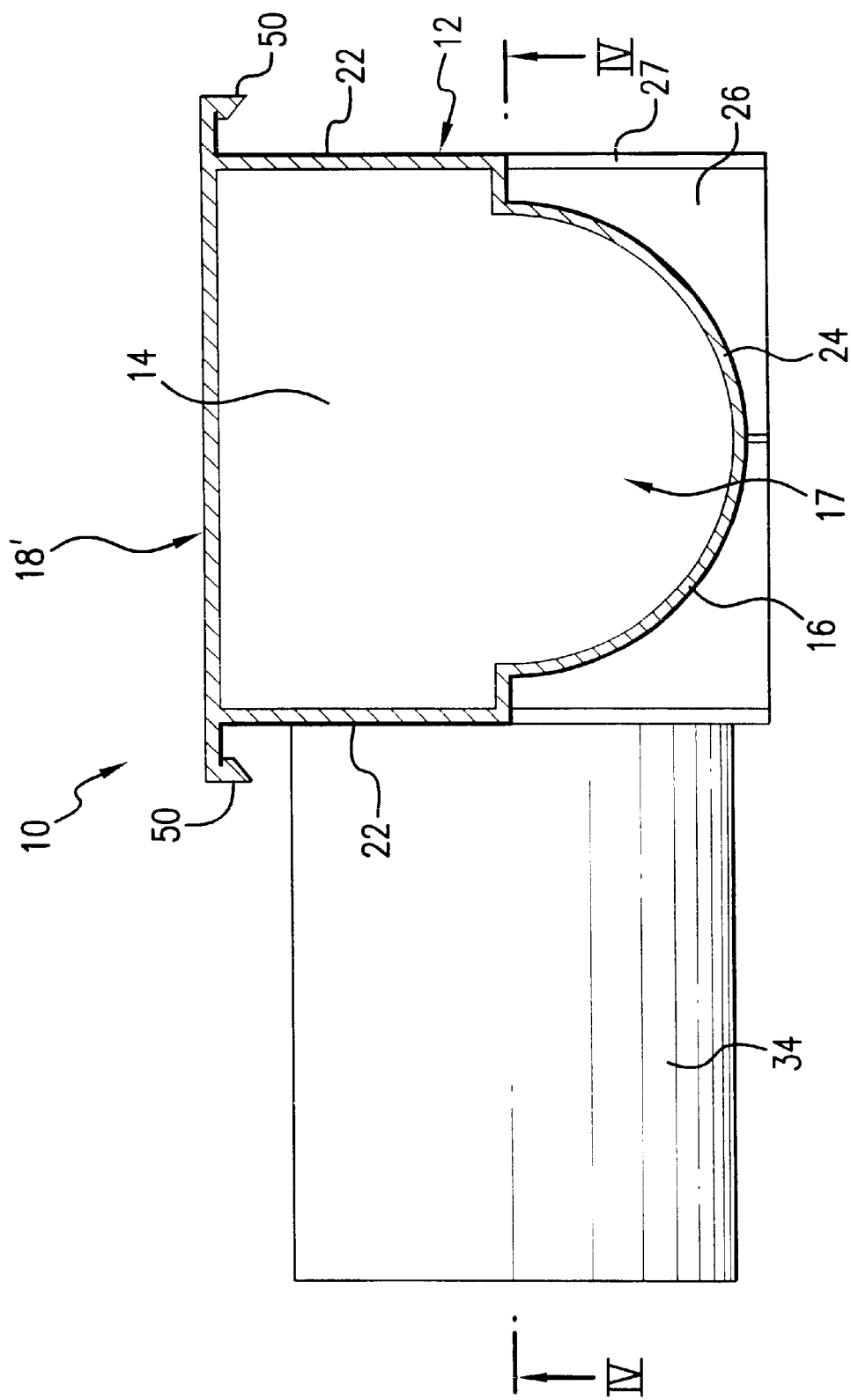
FIG. 5 shows a cross section similar to FIG. 4 of a further embodiment of the component according to the invention.
Figure 6:
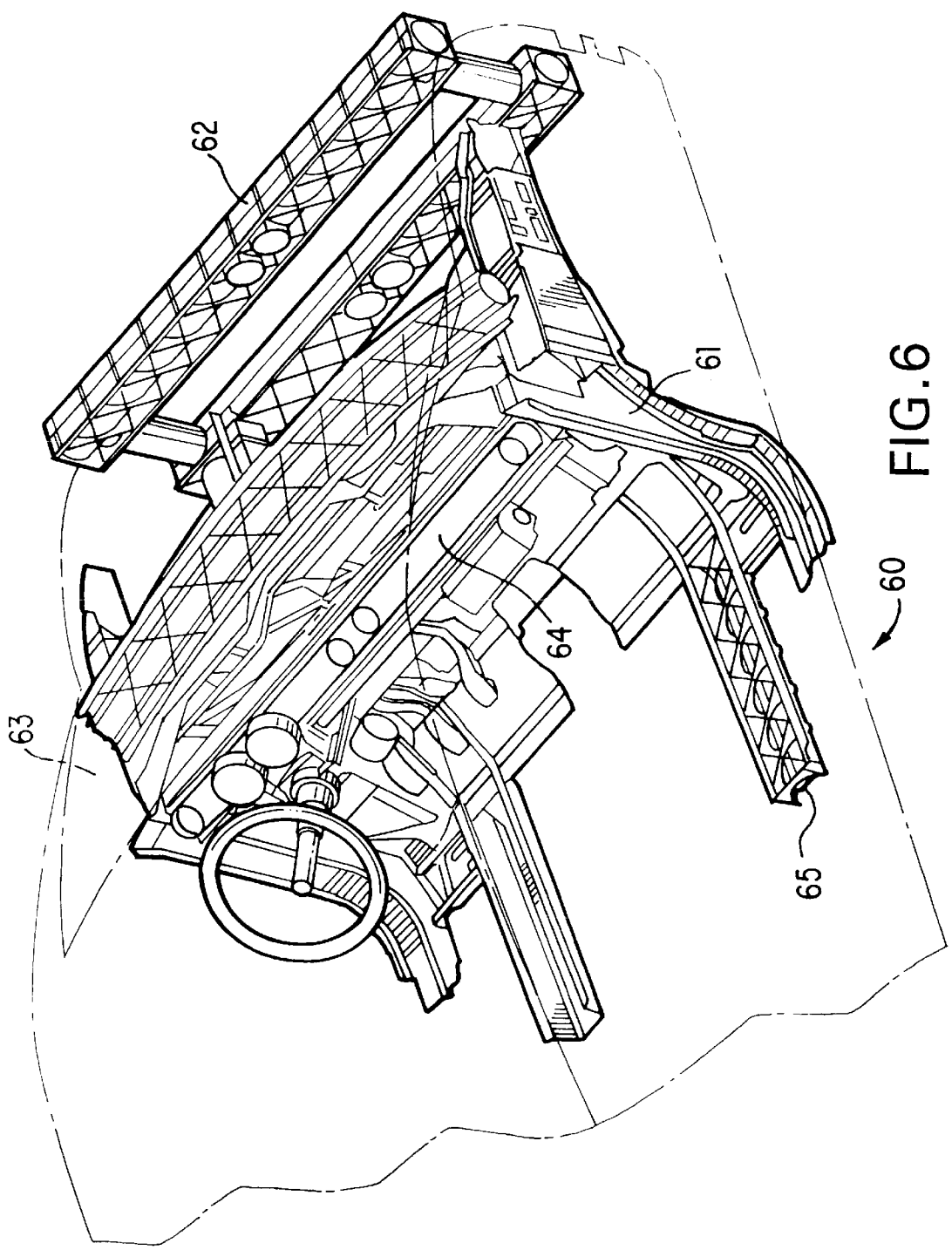
FIG. 6 shows a motor vehicle 60 with a vehicle frame 61, container for fuel 62, windshield 63, fluid transport line 64 and cables 65.

The invention is, of course, not to be limited to the illustrated cross sectional shapes of the base body and duct. For example, the cover 18 may be designed as in FIG. 5. In this exemplary embodiment, the base body 12 is formed together with the plastic shell 16 and the reinforcing ribs 26 in a similar manner to the first exemplary embodiment depicted in FIGS. 1 to 4. In this exemplary embodiment, however, the cover 18' is essentially of a relatively flat design and closes the open side of the U-shaped base body 12 so that the entire interior 14 forms the duct 17.

The component 10 is preferably used as a cross member in the cockpit region of a motor vehicle. Accordingly, component 10 is referred to as a cross member in the following description.

Preferably, axially next to the duct 17 in the cross member 10 a further duct 28 is arranged approximately symmetrically with respect to the first duct 17. (FIG. 3) The ducts 17 and 28 have a respective inlet stub 30 and 32 and outlet stub 34 and 36. Inlet and outlet stubs 30, 32, 34, 36 are, in each case, led laterally out of the cross member 10. The ends of the ducts must therefore be closed by end pieces 44 and 46.

These end pieces 44 and 46 can be injected together with the corresponding duct halves.

Like the ducts 17 and 28, the outlet stubs 34, 36 are of two-part design. One half is integrated with the respective plastic shell of the associated duct, and the other halves are integrated with the cover 18. In the exemplary embodiment illustrated, the inlet stubs 30 and 32 extend in the mold release direction, so that these stubs can be injected together as a single piece with the cover.

Depending on the intended use, the stubs can lead out of one of the four sides of the cross member 10. Preferably, the inlet stubs 30 and 32 are situated approximately in the center of the cross member 10, and the outlet stubs 34 and 36 are situated in the two end regions of the cross member 10. A cross member 10 formed in such a manner can be used not only for securing the dashboard and further components arranged in the region of the dashboard, such as a steering column, an airbag and the like, but can also be used simultaneously for guiding air from a centrally arranged air conditioning system to discharging vents arranged in the lateral regions of the vehicle interior.

The plastic shells corresponding to ducts 17 and 28 along with the inlet stubs 30 and 32, the outlet stub halves and the reinforcing ribs 26 together with the webs 27 may be injected in a common injection molding process. These plastic parts are connected to the base body 12 at discrete connecting points, as is already known from EP 0 370 342. At the discrete connecting points, the base body 12 has apertures which, although normally included, are not illustrated here for the sake of clarity and which the plastic passes through and covers.

The cross member 10 can be arranged between the A-pillars in a vehicle. In order to connect the cross member to the A-pillars, fastening elements can be provided which are fixed on the ends 40 and 41 of the component 10 in a suitable manner. These fastening elements may be welded onto the base body 12 before the plastic shell and plastic ribbed arrangement are injected.

The following additional preferred aspects of the invention have been contemplated and are within the scope of the invention.

The duct or ducts could have a plurality of chambers running parallel, so that a plurality of parallel subducts would be present. The presence of a plurality of subducts could increase the stability or strength of the component.

It is furthermore conceivable and within the scope of the invention for the component not to be of linear design, as illustrated in the drawing, but to be curved, bent at right angles or bent at other angles.

The foregoing embodiments have been shown for illustrative purposes only and are not intended to limit the scope of the invention which is defined by the claims.

What is claimed is:

1. A cross member suitable for a motor vehicle comprising:
    (a) a base body comprising a base, a first wall and a second wall arranged in a concave cross section;
    (b) a plastic reinforcing rib assembly injection molded on said base of said base body to stiffen said base body;
    (c) a plastic shell injection molded together with said plastic reinforcing rib assembly; bearing against the side of said base opposite to said plastic reinforcing rib assembly and extending in a longitudinal direction along at least a portion of the cross member; and
    (d) a cover covering said plastic shell and thereby defining a duct.

2. A cross member as claimed in claim 1, wherein said plastic reinforcing rib assembly comprises
    a first plastic web formed with said base body and extending, in the same plane as, but in the opposite direction from said first wall; and
    a second plastic web formed with said base body and extending in the same plane as, but in the opposite direction from said second wall, and plastic ribs extend between said first and second plastic webs.

3. A cross member as claimed in claim 1, wherein said cover is detachably fastened to said plastic shell.

4. A cross member as claimed in claim 1, wherein said cover is non-detachably fastened to said plastic shell.

5. A cross member as claimed in claim 1, wherein said cover comprises reinforcing ribs.

6. A cross member as claimed in claim 1, wherein said cover comprises an integral part of a housing of a heating or air conditioning system.

7. A cross member according to claim 1, further comprising fastening elements formed by injection molding and arranged on at least one of said cover and said plastic reinforcing rib assembly.

8. A cross member according to claim 1, further comprising cables passing through said duct.

9. A motor vehicle comprising a vehicle frame and a cross member for a motor vehicle according to claim 1 connected between said vehicle frame.

10. A motor vehicle according to claim 9, wherein said duct forms part of an air guiding duct for guiding defrosting air to a windshield of said vehicle.

11. A motor vehicle according to claim 9, wherein said duct comprises a container for at least one of wiping fluid for a windshield or headlights, cooling fluid, oil or compressed air.

12. A motor vehicle according to claim 9, wherein said duct comprises a fluid transport line.

* * * * *